(12) United States Patent
Huss et al.

(10) Patent No.: US 6,767,575 B1
(45) Date of Patent: Jul. 27, 2004

(54) PREPARATION OF AN AGGREGATE WHEY PROTEIN PRODUCT AND ITS USE

(76) Inventors: Manfred Huss, Hittostrasse 4, D-85354, Freising (DE); Thomas Spiegel, Maria-Birnbaumstrasse 10, D-80686, Munchen (DE)

( * ) Notice: Subject to any disclaimer, the term of this patent is extended or adjusted under 35 U.S.C. 154(b) by 0 days.

(21) Appl. No.: 09/913,548
(22) PCT Filed: Feb. 6, 2000
(86) PCT No.: PCT/DE00/00367
§ 371 (c)(1), (2), (4) Date: Oct. 1, 2001
(87) PCT Pub. No.: WO00/48473
PCT Pub. Date: Aug. 24, 2000

(30) Foreign Application Priority Data

Feb. 16, 1999 (DE) .......................................... 199 06 379

(51) Int. Cl.[7] .......................... A23J 3/08; A23C 21/00; A23G 9/02
(52) U.S. Cl. ...................... 426/656; 426/520; 426/583; 426/657; 530/833
(58) Field of Search ............................... 426/656, 657, 426/520, 583; 530/833

(56) References Cited

U.S. PATENT DOCUMENTS

| | | | |
|---|---|---|---|
| 4,107,334 A | * 8/1978 | Jolly | ............................. 426/7 |
| 4,265,924 A | 5/1981 | Buhler et al. | |
| 4,734,287 A | * 3/1988 | Singer et al. | ................. 426/41 |
| 4,879,131 A | 11/1989 | de Rahm | |
| 5,188,842 A | * 2/1993 | Visser et al. | ................. 424/535 |
| 5,350,590 A | * 9/1994 | McCarthy et al. | ........... 426/549 |
| 5,503,864 A | 4/1996 | Uchida et al. | |
| 5,948,462 A | * 9/1999 | Atsuta et al. | ................. 426/583 |
| 6,051,271 A | * 4/2000 | Yamamoto et al. | .......... 426/656 |

FOREIGN PATENT DOCUMENTS

| | | |
|---|---|---|
| DE | 3445223 | 10/1985 |
| EP | 0099296 | 1/1984 |
| EP | 0347237 | 12/1989 |
| EP | 0412590 | 2/1991 |
| EP | 0716810 | 6/1996 |
| FR | 1453815 | 8/1966 |
| WO | 8808673 | 11/1988 |
| WO | 8905587 | 6/1989 |
| WO | 9117665 | 11/1991 |
| WO | 9220239 | 11/1992 |

* cited by examiner

*Primary Examiner*—N. Bhat
(74) *Attorney, Agent, or Firm*—Ostrolenk, Faber, Gerb & Soffen, LLP

(57) ABSTRACT

The invention relates to a method for preparing a concentrate of denatured whey protein aggregate preferably having a mean aggregate size (median) of between 1 and 4 μm. Said method consists of the following steps: a) an aqueous solution enriched to a maximum protein content of 4% by weight, containing whey protein and having a pH of between 5.0 and 7.0 is thermally denatured to [≦80%] ≦90%, in relation to the protein content, under substantially non-shear conditions at a temperature of between 75 and 150° C. and by means of a holding period; and b) the resulting product is concentrated, preferably to a denatured whey protein concentration of between 5 and 20%.

12 Claims, 2 Drawing Sheets

PREPARATION OF AN AGGREGATE WHEY PROTEIN PRODUCT AND ITS USE

The invention relates to a process for producing a concentrate of denatured whey protein aggregates, preferably having a mean aggregate size (median) in the range from 1 to 4 μm, and to a stable foam product obtainable by this process.

Proteins in foods frequently do not exist as soluble individual molecules, but in the form of relatively large aggregates or particles. Such particulate structures can exist naturally, as is the case with casein micelles in milk or may not be formed until during the production process, for instance in the production of ricotta by coagulating the whey proteins [KALAB, M. (1990) "Microparticulate protein in foods", Journal of the American College of Nutrition, 9, 374–387]. The mouthfeel caused by such aggregates or particles is essentially influenced by their size. Particles which are smaller than 0.1 μm are not perceived, so that a watery-empty impression results [LÜTH, A. (1991): Frettreduktion mit Hilfe mikropartikulierter Proteine—ein neues Konzept zur Entwicklung von "Light-Produkten" [Fat reduction using microparticulate proteins—a novel concept for developing "light products", DMZ-Lebensmittelindustrie und Milchwirtschaft, 112, 762–766].

Protein aggregates which are in the size range of emulsified fat droplets, that is to say between 0.1 and 10 μm, can cause a creamy-smooth mouthfeel [MILLER, M. S. (1994) "Proteins as fat substitutes" In: Protein Functionality in Food Systems (Editors: HETTIARACHCHY, N. S.; ZIEGLER, G. R.), New York, Basle, Hong Kong].

Larger particles are detected in the mouth individually and are perceived as floury to sandy. However, it is not possible to define an exact limit of particle size at which roughness occurs, since subjective factors also play a role. Cited data extend from 3 to 40 μm. Other properties of the particles, such as shape, deformability and surface structure, also play a role, as do the properties of the surrounding environment, in particular its viscosity (MILLER, op. cit.).

FR-A 1 453 815 discloses a process for recovering the proteins remaining in the whey after coagulating milk, in which the whey is first adjusted to a pH between 4.6 and 7.0, in the case of the example to a pH of 4.65, and is then heated to a temperature between 70° C. and 100° C. in the case of the example 90° C., in order to precipitate out the proteins. The precipitated proteins are then removed by a centrifugation. Generally no information is provided on the size of the resultant protein aggregates in this publication. At the pH of 4.65 used in the case of the example, the proportion of protein aggregates in the desired order of size to achieve a creamy-smooth mouthfeel is low, however, and the yield of the process is therefore poor in this respect.

VISSER and BAKKER (EP-A 0 347 237) describe a process in which whey proteins are heated at low starting concentrations at temperatures below 100° C., in particular between 65° C. and 75° C. Within this temperature range the heating time is set so that no more than 10% of the proteins are denatured, that is to say become insoluble at a pH of 4.6. The denatured proteins are then concentrated, so as to give a dispersion of non-aggregated macrocolloidal particles having diameters of 0.1 to 10 μm.

Under similar heating conditions (60° C. to 80° C.), according to HAKAART et al. (EP-A 0 412 590) a food composition having an elevated content of α-lactalbumin can be produced from whey having a protein content of less than 8% or from an α-lactalbumin-enriched fraction, with simultaneous application of a low amount of shear. The non-aggregated microcolloidal particles which are obtained in this process have a mean particle size in the range from 0.1 to 10 μm.

WO-A 92/20239 [ASHER et al.] describes a process for producing a fat substitute for use in ice cream manufacture, in which, via ultrafiltering whey, a whey concentrate (WPC) is obtained and by subsequent short-time heating of the resultant whey concentrate to between 75° C. and 85° C., the whey proteins are partially denatured. This treatment leads to a product of coagulated particles of a size which is not defined in more detail. If the denaturation conditions are intensified in order to obtain a higher degree of denaturation, in the case of this known process a product is obtained having larger particles which can readily be differentiated, which makes it completely unsuitable for use in ice cream manufacture.

A subsequent mechanical treatment of heat-denatured whey proteins, in particular high shear, can also lead to aggregate sizes in the micrometer range: in a process developed by PAQUIN et al., [PAQUIN, P.; LEBEUF, Y.; RICHARD, J. P.; KALAB, M. "Microparticulation of milk proteins by high pressure homogenization to produce a fat substitute" in: IDF Special Issue 9303: Protein & Fat Globule Modifications 389–396 (1993], ultrafiltered and diafiltered whey is first heated in the neutral or acidic pH range at 95° C. for 5 min. This gives a roughly 90% denaturation and aggregation of the whey proteins. The heated concentrate is then homogenized in a special high-pressure homogenizer, called a microfluidizer, at a pressure of 750 bar. The coarsely aggregated structure is broken down by this treatment into small spherical particles of about 1 to 10 μm in diameter.

Comparable particle sizes were found by SPIEGEL, T. KESSLER, H. G. ["Continuous formation of gel structures and stable foams based on a heat treated and acidulated whey protein concentrate" in Texture of Fermented Milk Products and Dairy Desserts, Proceedings of the IDF Symposium in Vicenza, 106–114, (1998)], when a whey concentrate containing 10% protein and 13% lactose was heated at 80° C. and, during the subsequent cooling, was subjected to intensive shear treatment in a scraped-surface heat exchanger.

These known processes share the fact that the yield of protein aggregates in the desired size of about 0.1 to 10 μm is low. Furthermore, these processes are for the most part complicated and expensive and therefore not of interest for industrial application.

The object of the invention is therefore to provide a process for producing denatured whey protein aggregates, preferably having a size of essentially 0.1 μm to 10 μm [mean aggregate size (median) in the range from 1 to 4 μm] which is simple to carry out and is able to provide the desired protein aggregates reliably and in high yield.

This object is achieved by a process for producing a concentrate of denatured whey protein aggregates, preferably having a mean aggregate size (median) in the range from 1 to 4 μm, which comprises the steps that a) an aqueous solution containing whey proteins enriched to a protein content of at most 4% by weight is heat-denatured to ≦80%, based on the proteins, by hot-holding at a temperature in the range from 75 to 150° C. at a pH in the range from 5.0 to 7.0 under essentially non-shearing conditions, and that b) a concentration step is then carried out, preferably to a concentration of the denatured whey proteins between 5 and 20%.

The expression used above, that the mean aggregate size (median) is between 1 and 4 μm, means that, essentially, the aggregate size is to be between 0.1 and 10 μm; in this case the median is defined such that at a given particle size distribution, 50% by volume of the particles are below this value and 50% by volume are above it. This median is also abbreviated in specialist circles to $D_{50.3}$. If the aggregate size is to be "essentially" between 0.1 and 10 μm, this is to be taken to mean the fact that more than 90% by volume, preferably more than 95% by volume, of the aggregates are in said particle size range between 0.1 to 10 μm.

The inventive production process requires no shearing action, or only slight shearing action, so that complex apparatuses are not required.

An essential feature of the inventive process is that a controlled denaturation is carried out using the starting raw material in the inventively used temperature interval from 75 to 150° C. by hot-holding at a pH in the range from 5.0 to 7.0 under essentially non-shearing conditions.

In particular, the degree of denaturation to be set according to the invention in the process procedure is $\leq 90\%$, preferably $\leq 95\%$. The control of the inventive process achieved by setting the degree of denaturation represents the significant difference between the inventive process and the processes known to those skilled in the art. This ensures that the yield of denatured whey protein aggregates is extremely high, so that virtually all of the protein present can contribute to achieving the desired properties.

If the heat denaturation is not carried out in a controlled manner, even very small variations in the composition of the starting materials, for example different contents of the protein fractions present in the starting solution, for instance milk or whey, in the pH of the starting solution and similar mean that the desired content of denatured (whey) protein aggregates is not achieved. As a result, the product obtained does not then have the desired properties and cannot be used for the intended purpose.

The content of denatured proteins is determined in the inventive process using the method described in the examples; this is a routine test as carried out in many laboratories in connection with other investigations. Details of the measurement of the degree of denaturation are therefore described in more detail in the examples below.

The degree of denaturation thus measured is a parameter which is simple to measure, which makes it possible for a person skilled in the art to achieve the object set using the inventive process.

In the inventive process, the starting material which can be used is any aqueous solution of whey proteins, for example whey, whey from casein manufacture. However, the raw material preferably used is a milk microfiltration permeate, or directly a non-enriched whey, in particular sweet whey. The protein content of the solution used does not exceed 4% by weight according to the invention, preferably not 3%. Therefore, according to the invention it is not necessary to produce a protein concentrate, for example a WPC (whey protein concentrate) before the inventive denaturation process is carried out. The inventively preferred raw material is, as indicated above, non-concentrated whey, preferably sweet whey, which has a denaturable whey protein content in the concentration range between 0.5 and about 1% by weight. In exceptional cases, the content of such a whey may be up to 1.2% by weight. The lactose content of such a whey is between 4 and 6% by weight.

According to the invention the pH of the starting material is 5 to 7, preferably between 5.5 and 6.5. Most preferred is a range of about 6, in particular 6.0 to 6.5. This offers the advantage that whey from cheese manufacture can be used in unchanged form. However, the raw material used can also be whey whose protein content has been increased by conventional dairy concentration processes to a maximum of 4% by weight, in particular a maximum of 3% by weight.

The hot-holding time to be employed at a defined temperature in the range specified above to achieve a whey protein denaturation greater than 80%, preferably greater than 95%, is between 18 hours and 10 seconds. Time limits which have a general validity may only be established with difficulty, since these can differ greatly from one another depending on the composition of the starting material (see DANNENBERG and KESSLER ["Reaction Kinetics of the Denaturation of Whey Proteins in Milk", J. Food Sci. 53(1), 258–263 (1988)], where the results of special studies of individual whey protein fractions are reported). However, the hot-holding time required when the inventive process is carried out results from the degree of denaturation to be maintained.

The inventive process can be carried out using conventional dairy apparatuses such as plate heat exchangers or tubular heat exchangers or vessels. During these processes, shear forces customarily occur due to pumping and stirring operations. However, according to the invention, and in contrast to the processes known to those skilled in the art, no further shearing operations are carried out, to the extent that the inventive process is carried out under essentially non-shearing conditions. The shear rates occurring due to the unavoidable pumping and stirring operations mentioned are generally not greater than 2000 s$^{-1}$ to 1000 s$^{-}$, preferably not greater than 500 s$^{-1}$. The hot-holding of the raw material can also take place in complete absence of agitation.

According to the invention, the heat denaturation of the starting material, that is to say of the non-enriched whey, takes place in a temperature range between 75° C. and 150° C. However, particular preference is given to the temperature ranges between 110° C. and 150° C., and between 75° C. and 95° C., in particular 75° C. After the inventive heat treatment the product is cloudy, but still liquid.

The whey proteins are present predominantly as aggregates. Measurement using a laser diffraction spectrometer (Coulter LS 130) gives a content of >90% by volume of the aggregates in the inventive size range from 0.1 μm to 10 μm, and a content of >70% by volume in the preferred size range of 0.5 to 4 μm (see FIG. 2).

The heating is followed according to the invention by a concentration using conventional dairy processes, preferably by ultrafiltration or microfiltration, to a protein content of 5% to 20%. After the concentration the product is viscous and has a creamy-smooth consistency. The aggregate diameter is not significantly changed by this step. It is a particular advantage of the virtually complete denaturation and aggregation of the whey proteins before the subsequent concentration step that removing non-denatured contents to increase the yield is not necessary.

The product thus produced can be used directly; alternatively, however, it can also be dried, preferably by freeze-drying or spray-drying.

The inventively produced product can be added to the cheesemaking milk for the manufacture of soft cheese, slicing cheese and hard cheese, in order to increase the whey protein content in these cheeses and the yield. In the denatured and aggregated form, the whey proteins remain in the cheese mass and are not lost in the whey, in contrast to native whey proteins, as is customary in classic cheese manufacture.

It is also possible to use the product in process cheese, in frozen and non-frozen desserts, in fresh cheese or in spreads. In all these products, by adding the inventively produced whey protein product, the fat content can be reduced, because of the creamy properties. In addition, the content of casein which is present, for example, in these products in the form of cheese raw material or skimmed milk powder, can partly be replaced, since denatured aggregated whey proteins behave in a similar manner to casein.

In a further very particularly preferred embodiment of the inventive process, the product obtained after carrying out the concentration is foamed with use of a foaming apparatus, with the pH being set to 4.0 to 5.5. When this process step is carried out, it is not necessary to add foam stabilizers. If foam stabilizers are added at all, which may possibly be desirable for further optimization of the foam structure, the amount of foam stabilizers used is considerably reduced, compared with conventional processes for producing foamed products. In the case of gelatin, for example, instead of the 0.5% to 1% gelatin customarily added, only about 0.1% is necessary.

The pH is set by controlled addition of an acid. The acid added is, according to the invention, an acid selected from the group of organic acids or acids approved for foods. Preference is given to a mixture of lactic acid and citric acid, in the most preferred case a mixture of 4 mol/l of citric acid and 90% strength lactic acid in equal parts.

After carrying out the foaming, a foamed essentially, or even completely, foam-stabilizer-free product is obtained. Compared with customarily foamed products, the inventive product is distinguished in that, in the foamed state, depending on storage conditions, it is physically stable in storage for weeks or even months. Customary products produced from whey protein aggregates achieve a storage like of this type, if at all, only by the addition of foam stabilizers.

The invention is described in more detail in all its embodiments by the examples given below.

Figure 1:
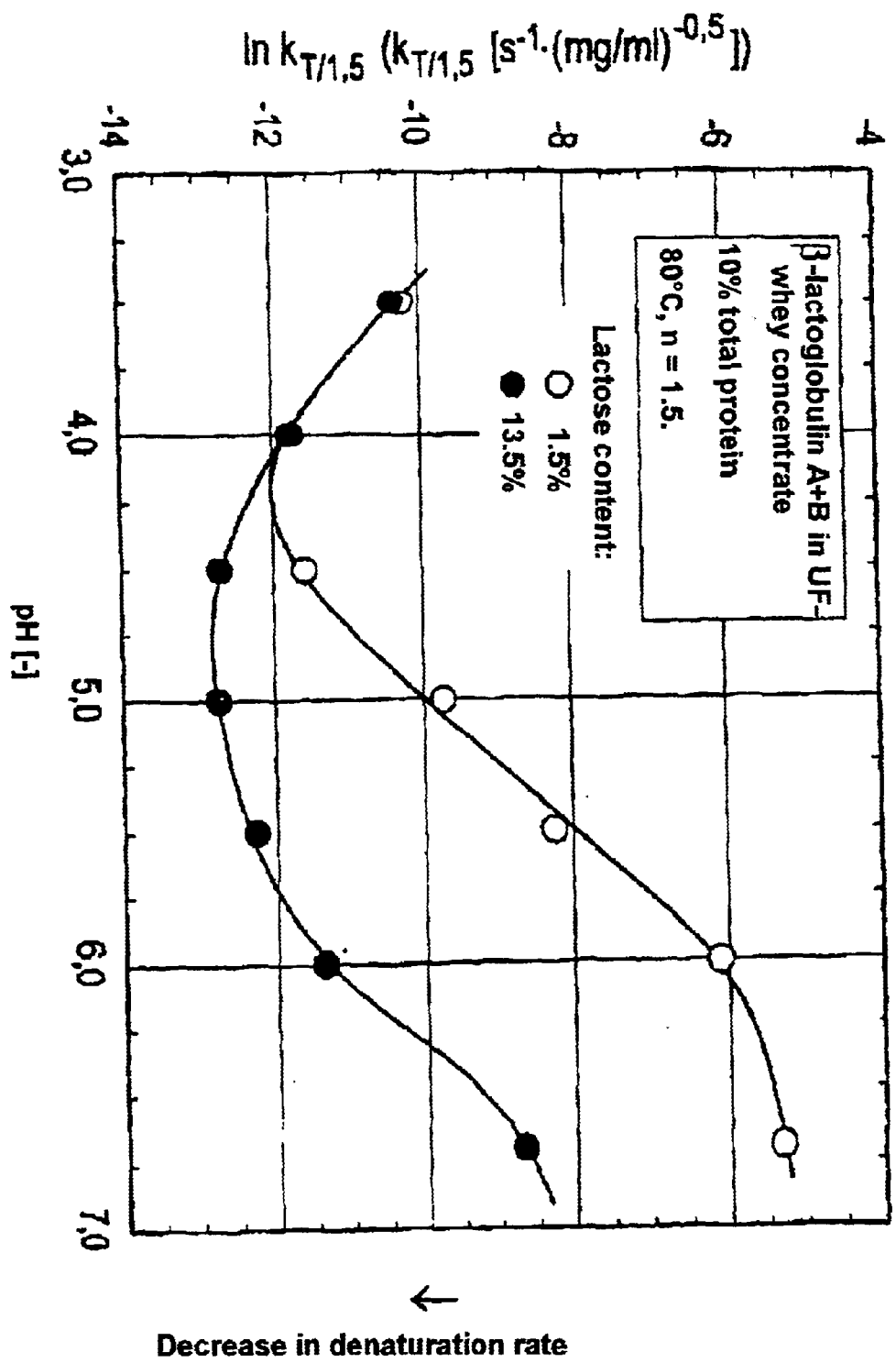
FIG. 1 shows the relationship of the rate constants of denaturation of β-lactoglobulin on pH, that is to say the change in the respective denaturation rate.
Figure 2:
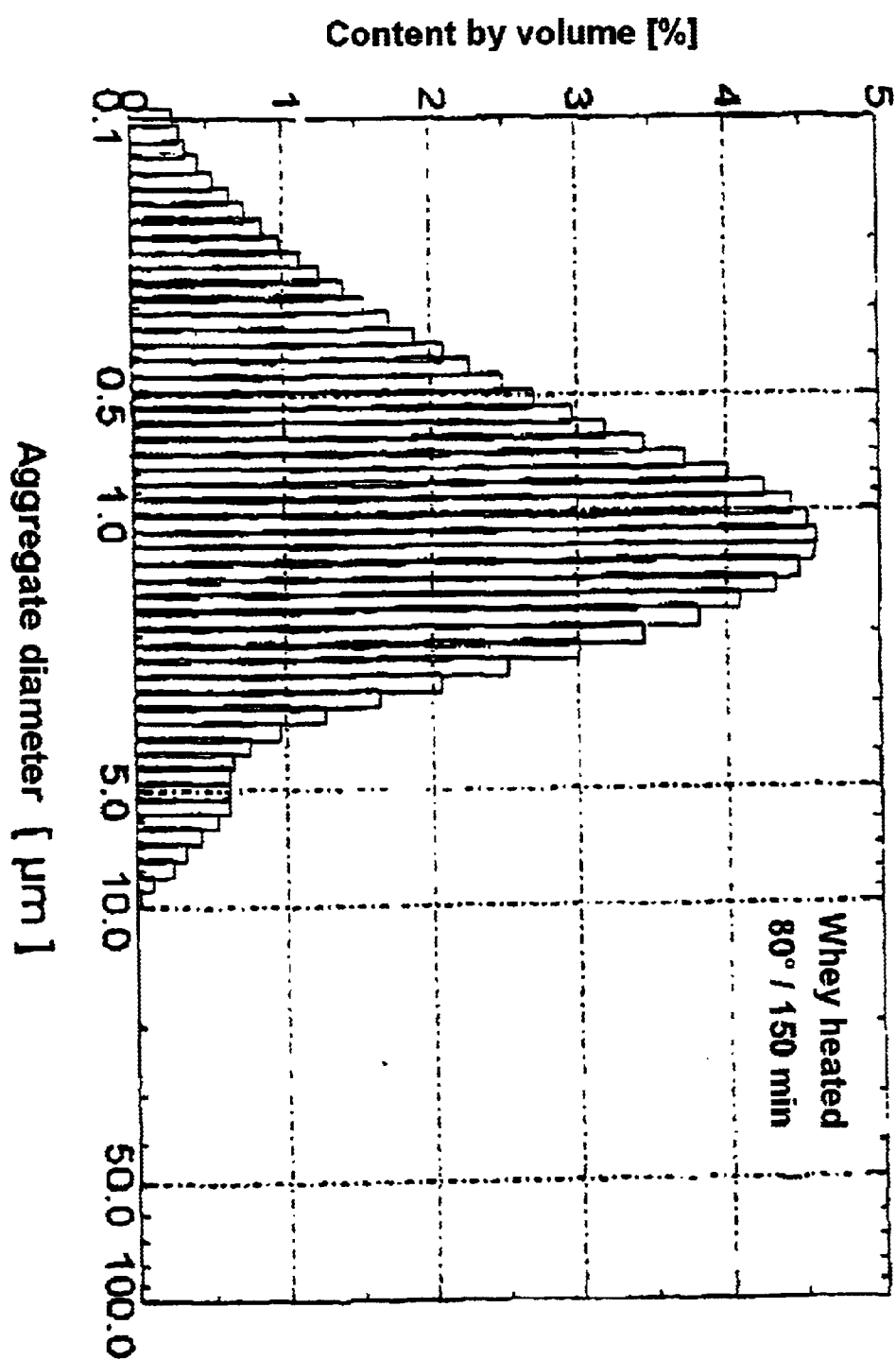
FIG. 2 shows by way of example the frequency distribution (content by volume versus particle diameter) of the whey protein aggregates produced by the inventive process. The accumulated content (% by volume) of the size classes which can be derived from the diagram is.

| Accumulated content (% by volume) | <10 | <25 | <50 | <7S | <95 |
|---|---|---|---|---|---|
| Size (up to . . . μm) | 0.32 | 0.59 | 1.1 | 1.8 | 3.8 |

PRODUCTION EXAMPLES

Example 1

A conventional whey, that is to say non-concentrated, having a protein content of 1.0% and a pH of 6.50 was heated in a plate heat exchanger and then subjected to hot-holding for 150 minutes in a tank at 80° C. The degree of denaturation was then measured by the following method:

The decrease in concentration of the native whey proteins as a result of the heating was determined by the chromatographic method [RP-HPLC: Reverse-phase high performance liquid chromatography] described in BEYER ["Zum Einfluβ de Proteinkonzentration auf das Denaturierungsverhalten der Molkenprotein sowie die damit verbundenen rheologischem Veränderungen" [The effect of protein concentration on the denaturation behavior of whey proteins and the associated rheological changes], Dissertation Faculty for Brewing, Food Technology and Dairy Science, Technical University of Munich, Munich (1990]. In this method the denatured whey proteins are separated off before analysis by precipitation at pH 4.6 and subsequent filtration. The individual native whey protein fractions, owing to differing hydrophobic properties, are adsorbed with varying strengths to the stationary support substance of the HPLC column. The protein fractions are desorbed stepwise from the stationary phase by gradient elution, that is to say by continuously changing the hydrophobic properties of the mobile phase flushed through the column. As a result the fractions elute at different times and can be detected separately by a UV detector. The signals are converted into a chromatogram plot in which the area under the individual peaks is proportional to the protein concentration. The degree of denaturation is calculated via the ratio of peak areas of the heat-treated and non-heated sample, taking into account the overall dilution factors in sample preparation:

$$DG = 1 - \frac{(F \cdot GVF)_{heated}}{(F \cdot GVF)_{non-heated}}$$

where:
DG: is the degree of denaturation,
F: is the peak area,
GVF: is the total dilution factor of the sample preparation.
The degree of denaturation determined in this manner in this example was for β-lactoglobulin 95% and for α-lactalbumin >95%, and the total degree of denaturation 95%.

Example 2

Production example 1 was repeated using a non-concentrated whey having a protein content of 0.9%, pH 6.55, the heating and the hot-holding being performed is a tubular heat exchanger in a continuous flow manner at 140° C. for 10 seconds.

The degree of denaturation determined in this example was for β-lactoglobulin 95% and for α-lactalbumin 80%, and the total degree of denaturation >85%.

Example 3

Production example 1 was repeated with a slightly concentrated whey (protein content 2.0% by weight, pH 5.0), the heating and hot-holding being performed in a pressurized vessel at 110° C. for 1 minute.

The degree of denaturation determined in this example was for β-lactoglobulin >95%, and for α-lactalbumin >95%, and the total degree of denaturation >95%.

Use Example

Use Example 1: Process Cheese/Process Cheese Preparations

A process cheese having a high whey protein content was manufactured according to the following formula:

| | Content | Protein content |
|---|---|---|
| Hard cheese/slicing cheese | 58% | 24% |
| Whey concentrate produced | 17.5% | 10% |

-continued

| | Content | Protein content |
|---|---|---|
| Emulsifying salt | 3% | |
| Butter | 9% | |
| Water | 12.5% | |
| | 100% | |

The process cheese thus prepared exhibited outstanding creaming behavior and also good spreadability.

Use Example 2: Dairy Ice Cream

Ice cream mix of the following composition was frozen after pasteurization and homogenization. The whey protein product produced according to the invention can be added before the pasteurization and homogenization, because of its high degree of denaturation and the associated high heat stability and shear stability.

| | Content | Protein content |
|---|---|---|
| Skimmed milk powder | 5.5% | 35% |
| Whey protein powder produced according to the invention | 5.5% | 35% |
| Milk fat | 5% | |
| Glucose syrup | 5% | |
| Sucrose | 10% | |
| Water | 69% | |

The ice cream thus produced exhibited a creamy mouthfeel and very good melting stability, even without addition of emulsifiers/stabilizers.

Use Example 3: Foamed Food

A storage-stable formed food was produced by foaming the inventively produced whey product (10% protein) with simultaneous acidification using lactic acid (90% strength) to pH 4.5. The foam was physically stable for several weeks without any addition of stabilizers or non-milk ingredients. For sensory reasons, sugar and aroma/fruit concentrate constituent can also be added to the formula.

What is claimed is:

1. A process for producing a concentrate of denatured whey protein aggregates, the process essentially consisting of the steps that a) an aqueous whey protein solution having a whey protein content of at most 3% by weight is heat-denatured by hot-holding at a temperature in the range from 75 to 150° C., at a pH in the range from 5.0 to 7.0 under essentially non-shearing conditions in such a manner that $\leq 90\%$ of the whey protein are heat-denatured to form whey protein aggregates having a mean aggregate size (median) in the range from 1 to 4 $\mu$m, and that b) a concentration step is then carried out.

2. The process as claimed in claim 1, wherein the aqueous solution containing whey proteins is selected from a milk microfiltration permeate and a whey.

3. The process as claimed in claim 1, wherein, when the hot-holding under essentially non-shearing conditions is carried out, a value for the shearing rate of 2000 s–1, is not exceeded.

4. The process as claimed in claim 3, wherein, when the hot-holding under non-shearing conditions is carried out at a value for the shearing rate of 1000 $\sec^{-1}$ is not exceeded.

5. The process as claimed in claim 1, wherein the aqueous solution is a non-enriched whey.

6. The process as claimed in claim 1, wherein the pH of the aqueous solution is between 5.5 and 6.5.

7. The process as claimed in claim 6, wherein the pH of the aqueous solution is between 6.0 and 6.5.

8. The process as claimed in claim 1, wherein the hot-holding time is between 10 seconds and 18 hours.

9. The process as claimed in claim 1, wherein the temperature during the hot-holding step is 95° C.

10. The process as claimed in claim 1, wherein the temperature during the hot-holding step is between 110° C. and 150° C.

11. The process as claimed in claim 1, wherein the concentration step, an ultrafiltration apparatus, a microfiltration apparatus, a separator and/or a decanter is used.

12. A process for producing a foamed product comprising denatured whey protein aggregates, having a mean aggregate size (median) in the range from 1 to 4 mm, in which the process as claimed in claim 1 is carried out, the resultant concentrate is foamed without addition of foam stabilizers with a pH of 4.0 to 5.5 being set.

* * * * *